United States Patent [19]
Konvalina

[11] 3,725,652
[45] Apr. 3, 1973

[54] COMPUTER CONTROLLED MACHINE TOOL SYSTEM WITH STORED MACRO LANGUAGE PROGRAM FOR EFFECTING PATTERN TYPE PUNCHING OPERATIONS

[75] Inventor: John Konvalina, Williamsville, N.Y.

[73] Assignee: Houdaille Industries, Inc., Buffalo, N.Y.

[22] Filed: June 1, 1971

[21] Appl. No.: 148,829

[52] U.S. Cl. ............. 235/151.11, 318/568, 318/600, 340/172.5, 444/1
[51] Int. Cl. ..................... G06f 15/46, B23q 21/00
[58] Field of Search ...235/151.1, 151.11; 340/172.5; 83/71; 90/13 C, DIG. 27; 72/7; 318/568, 569, 570, 600, 601

[56] References Cited

UNITED STATES PATENTS

| | | |
|---|---|---|
| 3,634,662 | 1/1972 | Slawson..........................235/151.11 |
| 3,579,192 | 5/1971 | Rasche et al......................340/172.5 |
| 3,593,313 | 7/1971 | Tomaszewski et al.............340/172.5 |
| 3,585,600 | 6/1971 | Saltini...............................340/172.5 |
| 3,562,715 | 2/1971 | Bishop et al..................235/151.11 X |

OTHER PUBLICATIONS

Dailey et al.: High-Performance Minimal Cycle Control Store Configuration. IBM Tech. Discl. Bull. Vol. 12 No. 2, 7/69, p. 337–338
Digital Equipment Co.: Quickpoint-8 N/C Tape Preparation System. Dig. Control Handbook, pages 201/202 1968

*Primary Examiner*—Felix D. Gruber
*Attorney*—Hill, Sherman, Meroni, Gross & Simpson

[57] ABSTRACT

In a computer controlled punching machine system a macro language program of the type conventionally used to generate commands for executing geometric patterns during tape preparation is supplied as part of the control program for the computer so that the conventional numerical control tape can be replaced by an abbreviated tape utilizing macro commands for representing desired pattern type moves.

2 Claims, 10 Drawing Figures

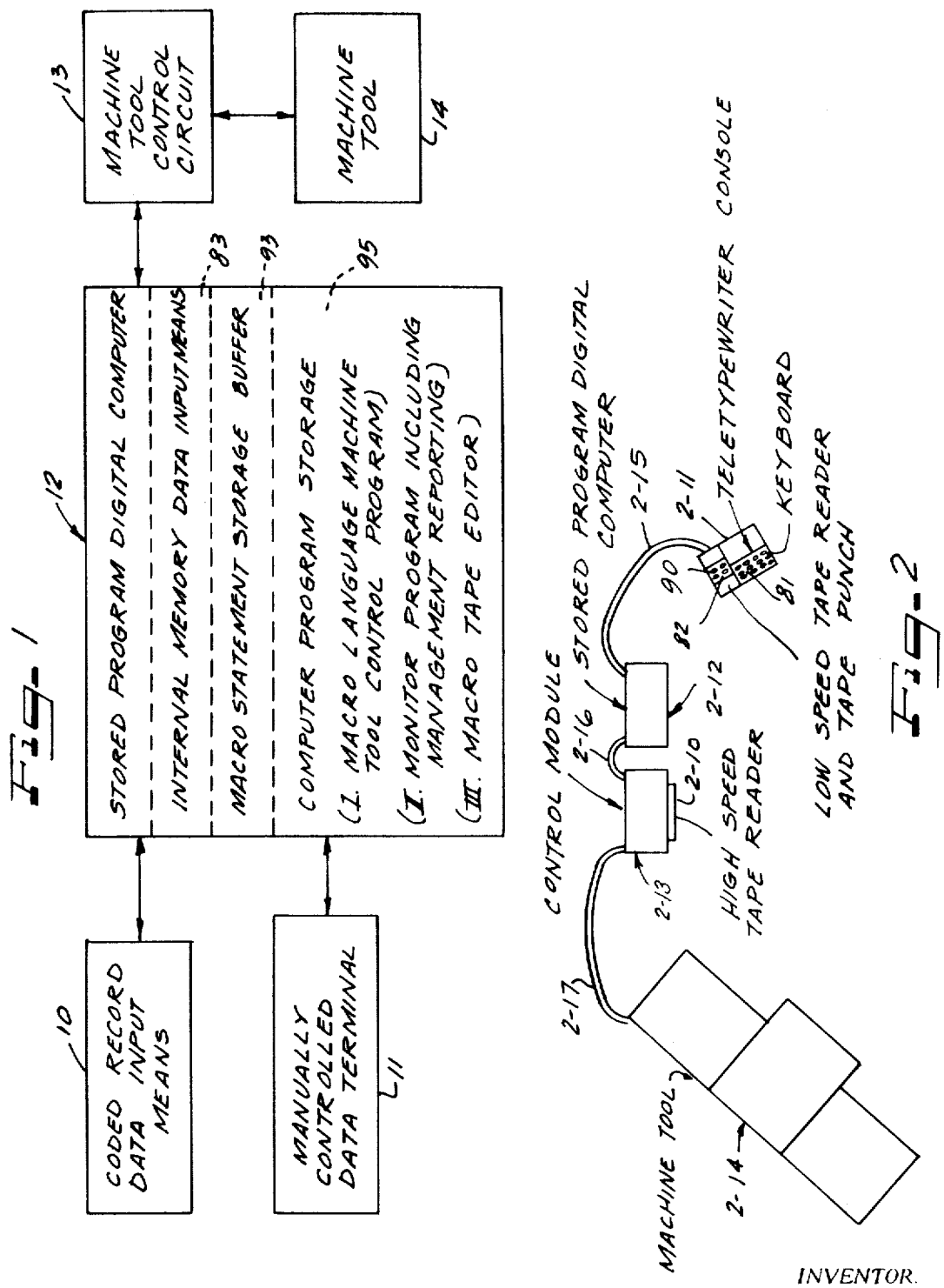

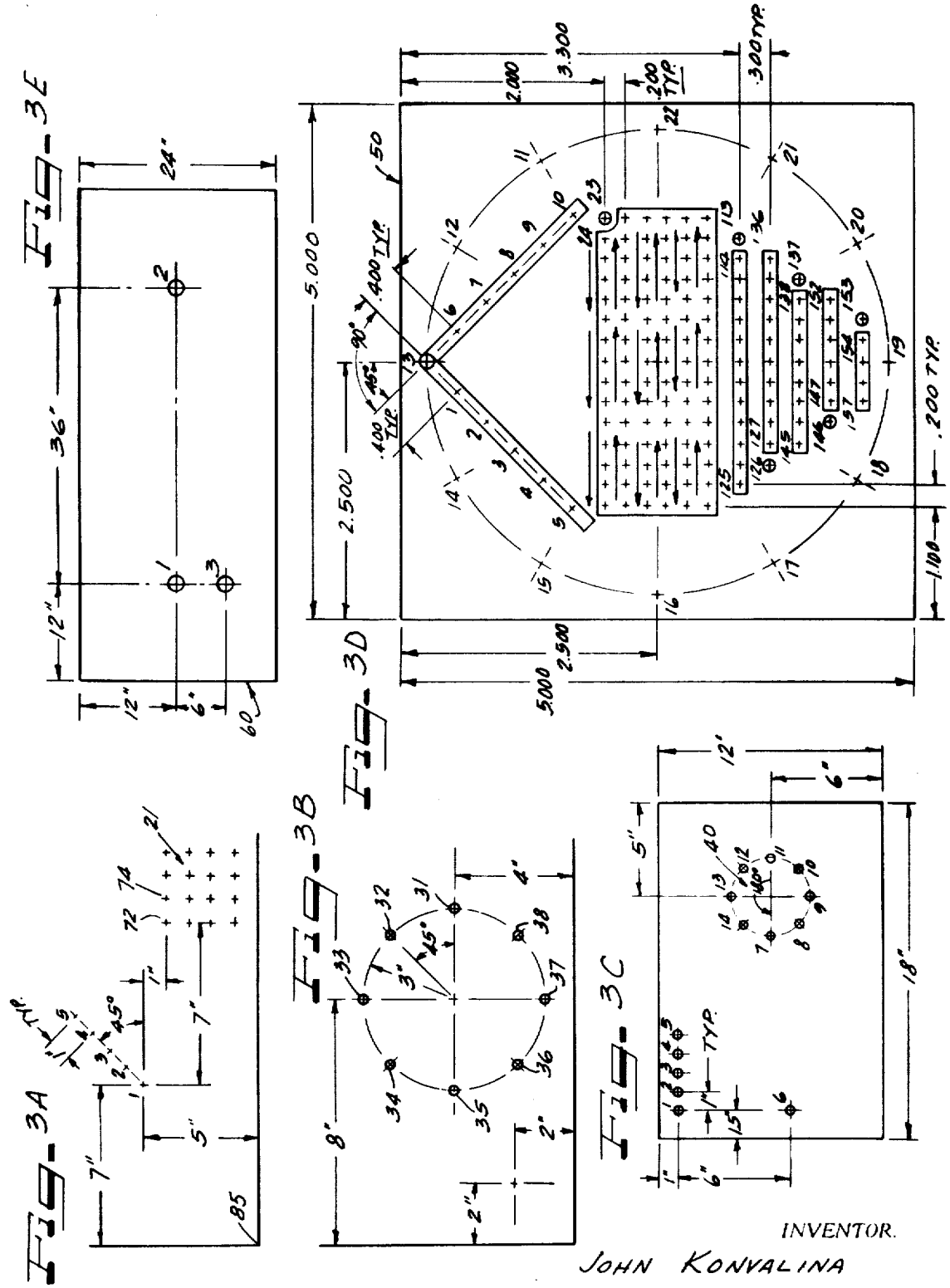

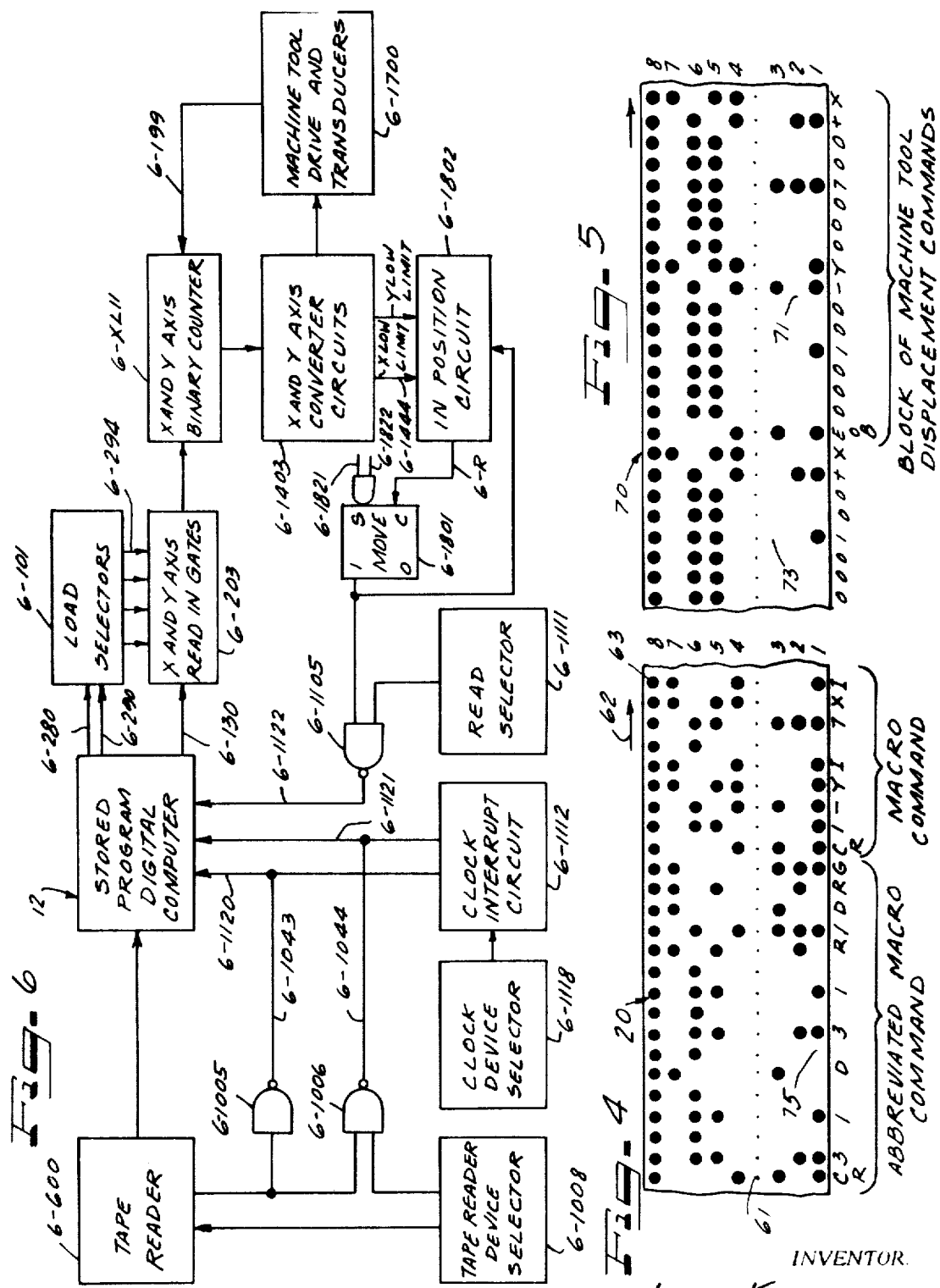

COMPUTER CONTROLLED MACHINE TOOL SYSTEM WITH STORED MACRO LANGUAGE PROGRAM FOR EFFECTING PATTERN TYPE PUNCHING OPERATIONS

CROSS-REFERENCES TO RELATED APPLICATIONS

Reference is made to a copending application filed of even date herewith, Konvalina Ser. 148,704, which discloses a related invention involving a particular macro language program which may be used in place of previously known macro language programs such as that referred to herein.

The present application concerns improvements over the disclosure of a commonly-owned prior application, U.S. Ser. No. 744,392 filed July 12, 1968, now U.S. Pat. No. 3,634,662 issued Jan. 11, 1972.

The machine tool control circuit of one embodiment herein is disclosed in detail in the aforesaid application Ser. No. 744,392, while a machine tool control circuit for a second embodiment is described in detail in a commonly-owned copending application, U.S. Ser. No. 839,971 filed July 8, 1969, now U.S. Pat. No. 3,622,763 issued Nov. 23, 1971.

SUMMARY OF THE INVENTION

This invention relates to a machine tool control system and method, and particularly to such a system and method which is operable to respond to abbreviated macro instructions each representing a pattern type movement with respect to the various axes of the machine tool.

The term "abbreviated macro instructions" is utilized to refer to relatively brief statements which are capable of generating a series of coordinate moves on the machine tool. Examples of abbreviated macro instructions include various geometric commands for generating points in geometric configurations such as lines, grids, arcs and circles. Another example would be a "cut" command such as CUT/10 5 1 1 which would serve to generate the series of points necessary to produce a rectangular cutout pattern with an X axis dimension of 10 inches, and a Y axis dimension of 5 inches with a notching tool of square configuration 1 inch on a side. As an extreme example, a two inch length of conventional punched tape with a macro command thereon could in theory represent a square matrix or grid 4,000 holes by 4,000 holes. Using the conventional method of programming these 16 million holes, would require 250 miles of punched tape which is 1300 rolls of 1000 foot length at a cost of $30,000. Working 8 hours a day, it would take over 2 years to punch the tape.

It is, therefore, an object of the present invention to provide a machine tool control system and method which is directly operable to respond to abbreviated macro instructions, whereby input data may be stored in a substantially more compact and economical form.

Another object of the present invention is to provide a machine tool control system and method which is extremely flexible and which simplifies and increases the production of parts with a machine tool.

A further object of the invention is to provide a machine tool control system and method enabling reduced tape handling by the machine operator, or in many cases the complete elimination of such tape handling by the machine operator.

Still another object of the invention resides in a simplified method of communication with a machine tool control system so as to greatly facilitate parts programming.

Yet a further object resides in the utilization of an on-line computer which is capable of concurrently controlling a machine tool to produce parts and of performing various other software tasks such as providing time and productivity reports on the machine tool and/or the assisting of the preparation of new macro instruction tapes or the editing of previously prepared macro tapes.

Other objects, features and advantages of the present invention will become more apparent with the teaching of the principles of the invention in connection with the disclosure of the preferred embodiment thereof, as shown in the drawings and described in the specification and claims.

BRIEF DESCRIPTION OF THE DRAWINGS

FIG. 1 is a block diagram illustrating the overall relationship of components for the illustrated embodiment;

FIG. 2 is a schematic plan view illustrating the physical arrangement of the parts of the embodiment of FIG. 1 on a factory floor;

FIG. 3 consisting of FIGS. 3A thru 3E, illustrate piece part layout diagrams useful in explaining a commercial system in accordance with the illustrated embodiment;

FIG. 4 illustrates a section of punched tape for use with the tape readers of FIG. 2 in practicing the present invention;

FIG. 5 illustrates the format of a conventional numerical control tape with the indicated block of machine tool displacement commands in FIG. 5 corresponding to that represented by the first macro command in FIG. 4; and FIG. 6 is a schematic block diagram illustrating the hardware interface between the programmed computer and the machine tool for the commercial system.

DETAILED DESCRIPTION OF A PREFERRED EMBODIMENT

FIG. 1 illustrates the basic components of a commercial system in accordance with the present invention. In terms of hardware, the illustrated system comprises a coded record data input means 10, a manually controlled data terminal 11, a stored program digital computer 12, a machine tool control circuit 13 and a machine tool 14.

Referring to the physical layout of FIG. 2, which may illustrate the layout of the physical components on a factory floor, reference numeral 2-10 designates a high-speed tape reader which may constitute the coded record data input means 10 represented in FIG. 1, teletypewriter console 2-11 may constitute an embodiment of the manually controlled data terminal 11 of FIG. 1, computer 2-12 may correspond with the computer 12 of FIG. 1, control module 2-13 may contain the machine tool control circuit 13 of FIG. 1 and the machine tool 2-14 may constitute an embodiment of the machine tool represented at 14 in FIG. 1. In FIG. 2, relatively short electric cables (for example not more than about 50 feet in length) are indicated at 2-15, 2-16, and 2-17 for providing electrical communication between the various physical components in FIG. 2.

In accordance with a particular commercial embodiment of the illustrated system, computer 2–12 may comprise a model PDP8/L computer manufactured by Digital Equipment Corporation, Maynard, Massachusetts. The teletypewriter console 2–11 may comprise the model ASR-33 Teletype Unit. The machine tool 2–14 may comprise the Strippit Fabramatic 30/30 punch press provided with an Automatic Progressive Move System. The control module 2–13 may conform essentially with the circuitry of the aforementioned copending application Ser. No. 744,392 filed July 12, 1968.

Alternatively, the computer 2–12 may be connected in place of the tape reader (12) in the numerical control circuit of said application Ser. No. 839,971, filed July 8, 1969, so that the computer 2–12 supplies the blocks of machine tool control commands, one eight bit character at a time, just as they would be supplied to the numerical control circuit by the tape reader (12), the reference numeral in parentheses corresponding to that used in said application Ser. No. 839,971. For this system, the electric cables may have a length up to 5000 feet, for example.

Reference is made to the tenth figure of said prior application Ser. No. 744,392 filed July 12, 1968, and the description pertaining thereto, for an explanation of the hardware utilized in computer control of a high-speed tape reader such as indicated at 2–10 in FIG. 2.

In general, the relationship of the components 2–10 through 2–14 in FIG. 2 is similar to that disclosed in detail in the copending application Ser. No. 744,392, which discussion has been incorporated herein by reference, and in the related patents: British Specification Nos. 1,235,555 and 1,235,556 published June 6, 1971; French Pat. No. 1,583,529 granted Sept. 29, 1969; Italian Pat. No. 838,788 dated Mar. 1, 1969; Swiss Pat. No. 497,740 dated July 15, 1970.

The new features of the present invention relate to the operation of the computer diagrammatically indicated at 12 in FIG. 1 to transmit blocks of machine tool data generated in response to abbreviated macro commands on the punched tape such as indicated at 20 in FIG. 4, directly to the machine tool control 13 without any need for a memory capacity to store the series of blocks, and without any need to place the blocks on punched tape.

The abbreviated macro statement are identified by characters such as DUP (duplicate), LAA (line at an angle command), GRD (grid command), BHC (bolt hole circle command), and ARC (arc command). These types of macro statements are known per se as evidenced by the publication *Digital Control Handbook*, 1971, pages 339–345.

Referring to FIG. 3A, points No. 2, 3, 4 and 5 are generated by a line at an angle (LAA) macro command, while the points of the grid pattern 21 (except point 72), FIG. 3A, are generated by a grid type macro command (GRD). Referring to FIG. 3B, the points for holes 31–38 are generated by a bolt hole circle macro command (BHC). Referring to FIG. 3C, holes No. 2–5 are generated by a duplicate (DUP) macro command, while the circle of holes indicated at 40 is generated by the bolt hole circle abbreviated macro command.

FIG. 3D indicates diagrammatically a piece part 50 with a relatively more complex layout of holes to be punched by the machine tool 2–14 of FIG. 2, for example. FIG. 3E illustrates a layout of holes for a relatively long piece part 60, requiring that the piece part be indexed prior to the production of hole No. 2, for example.

Referring in greater detail to the punched tape indicated at 20 in FIG. 4 which forms part of the coded record data input means 10 of FIG. 1, a line of sprocket feed holes is indicated at 61 for facilitating movement of the tape 20 in the direction of arrow 62 for the scanning of the successive rows of holes or other indicia such as indicated at 63. The indicia 63 may be arranged so as to represent successive characters of a macro instruction, such as the macro instruction IX7 IY–1, which refers to the coordinates of a move from point No. 1, FIG. 3A, to point 72. As indicated at the lower margin of the tape 20, the first row of indicia 63 may represent the character I (incremental) in a conventional format, the second row of indicia may represent the character X (referring to the X-axis of the machine tool), the third row of indicia may represent the character 7 (referring to distance to be moved in inches), and so on, so that the first section of coded indicia represents the macro instruction IX7 IY–1. Utilizing a conventional arrangement on a punched tape 70, FIG. 5, the same information is shown as a block 71 of machine tool displacement commands, which referring to the example of FIG. 3A would direct the machine tool control to move from point number 1 to the point indicated at 72 in FIG. 3A. A portion of a second block 73 of machine tool control data in the conventional format is indicated in FIG. 5 which would be operative to cause the machine tool to position at point 74, FIG. 3A. The block 73 in its entirety would read: X + 001.000 Y + 000.000.

Section 75 of tape 20 shows an arrangement of indicia 63 to represent a grid type abbreviated macro instruction (GRD/R 1 3 D 1 3) which is utilized to generate not only point 74, but the 14 additional points of the grid pattern 21, FIG. 3A. It will be understood that the generation of point 74 and the following points of the grid 21 would require a length of tape 70, FIG. 5, approximately fifteen times the length of the block 71 shown in FIG. 5, which is generally fifteen times as long as the section 75 of tape 20 required to generate the points of the grid 21. The grid type macro instruction shown at 75, FIG. 4, could be typed on the teletypewriter keyboard indicated at 81. The typing of this abbreviated macro instruction on the keyboard 81 could be utilized to produce the section 75 of tape 20 by means of a low speed tape reader and tape punch indicated at 82 in FIG. 2, or the console 2–11 of FIG. 2 could be connected directly on line with the adjacent computer 2–12 in a TYPE mode so as to transmit the abbreviated macro instruction 75 directly to an internal memory section such as diagrammatically indicated at 83 in FIG. 1. A manual control known as TAPE START may be manually actuated by the operator so as to cause the computer 12 to calculate the successive corresponding blocks of machine tool displacement commands for generating the sequence of points as represented at 21 in FIG. 3A. The computer 12 would then supply to the control circuit 13 successive blocks of machine tool displacement commands which would cause the machine tool to position a work piece for operation (such as punching) at the successive points of grid 21 in FIG. 3A.

By way of example, internal memory section 83 of computer 12 may represent an area of computer memory large enough to store 100 (decimal) lines of macro commands. (A line of 72 characters in length can be supplied to the computer 2-12 from the teletypewriter console 2-11). The internal memory section indicated at 83, FIG. 1, thus may serve as a data input means in place of an external input means such as indicated at 10, FIG. 1.

Macro instructions may be supplied to internal memory section 83, FIG. 1, by means of the high speed tape reader indicated at 10 in FIG. 1 and at 2-10 in FIG. 2. Macro instructions can be provided to section 83 also by means of the low speed tape reader which forms part of component 11, FIG. 1, and is indicated at 90 in FIG. 2. Thus in the event that the high speed tape reader 2-10 should be inoperative, a macro piece part tape such as indicated at 20, FIG. 4, can be loaded into memory section 83 through the low speed tape reader 90 of the teletypewriter console 2-11, FIG. 2. The piece part would then be produced on the machine tool 2-14 directly from the computer memory section section 83.

The user may produce a new macro piece part tape or edit a previously made macro tape on line with the computer system 12 with the use of the teletypewriter console 2-11 concurrently with the operation of the machine tool 14 in response to a coded record such as indicated at 20 in FIG. 4 which is associated with the high speed tape reader of component 10, FIG. 1. A section of computer internal memory is indicated at 93 which may be utilized for storing macro instructions as they are manually generated by means of the data terminal 11 or specifically by means of the keyboard 81, FIG. 2. This mode of operation of the computer system 12 is analogous with that disclosed in the prior application Ser. 744,392, with, however, the highly significant exception that the storage buffer section 93 is utilized to contain the successive lines of macro statements including abbreviated macro statements such as indicated at 75 in FIG. 4. Thus, storage buffer 93 can contain vastly more information than would be the case if the buffer were to store successive blocks of machine tool displacement commands such as block 71 indicated in FIG. 5.

The section of the computer system 12 which is utilized to store the various programs for the system is generally indicated at 95 in FIG. 1. As indicated, the computer internal memory may store a macro language machine tool control program (identified as program I in section 95), a monitor program (identified as program II in section 95) and a macro tape editor program (identified as program iii in section 95). Depending upon the capacity of the internal memory of computer 12, section 95 may simultaneously contain all three of the indicated programs together with additional programs, or various sets of the programs may be loaded into the computer memory by means of the input means 10 as required.

So as to facilitate a comprehension of the manner in which computer 12 may cooperate with the components of the prior application Serial 744,392, FIG. 6 illustrates an overall schematic block diagram, wherein the components of Ser. 744,392 have been given similar reference numerals preceded by the characters "6-". Where a component of FIG. 6 represents a series of components in the prior application, a single reference numeral from the prior application has been utilized in designating the component of FIG. 6.

Referring to FIG. 6, tape reader component 6-600 corresponds to components (600) and (601) in the sixth figure of said application Ser. 744,392, component (601) being shown in greater detail in the tenth figure of said application. Device selector component 6-1008 corresponds to selector components (1008), (1009) and (1010) in the tenth figure of said application. Selector component 6-101 in FIG. 6 corresponds to components (101), (114), (207) and (208) in the second figure of said application. Binary counter component 6-X11 in FIG. 6 corresponds to the X and Y axis binary counters of said application such as the counter XL11-XL0, XU11-XU0 of the first figure of said application.

Converter components 6-1403 of FIG. 6 corresponds to the circuitry illustrated in the fourteenth and fifteenth and sixteenth figures of said application. In position component 6-1802 corresponds to components (1802), (1803), (1813) and (1811) of the eighteenth figure of said application, which circuitry controls the move flip-flop (1801) of the eighteenth figure of said application. Component 6-1700 of FIG. 6 represents the circuitry of the seventeenth figure of said application, components such as (111), (112) and (117) in the first figure of said application, and circuitry such as illustrated in the fourth figure of said application which supplies feedback pulses via a line (199) which is indicated at 6-199 in FIG. 6, causing the command numbers from the computer which are entered in the counter component 6-XL11 to be counted down to zero as the load approaches the command end position. When both the X and Y axis loads have been within the null zone for a time interval as determined by component (1813), a signal is supplied as indicated at 6-R from components 6-1802 to the move flip-flop 6-1801 to reset the move flip-flop and to provide a move-complete signal at conductor 6-1122. Referring to the eleventh figure of said copending application, it will be observed that the move flip-flop (1114) is connected with input of a gate such as indicated at 6-1105, FIG. 6, so that when a selector such as indicated at 6-1111 is actuated by the computer, the condition of the move flip-flop can be determined.

The clock interrupt circuit 6-1112 in FIG. 6 corresponds to components such as (1117), (1112), (1113), (1110), (1103) and (1119) as shown in the eleventh figure of the application Ser. 744,392. Thus the computer by actuating selector 6-1118 can determine whether an interrupt signal on bus 6-1120 was caused by component 6-1112. Similarly the computer can determine whether the tape reader produced an interrupt on bus 6-1120 by actuating selector 6-1008.

Since the disclosure of the application Ser. 744,392 has been incorporated herein by reference, it is deemed unnecessary to provide herein any further specific description of FIG. 6.

It will be apparent that many other modifications and variations may be effected without departing from the scope of the novel concepts of the present invention.

I claim as my invention:

1. In a machine tool control system including
   a. a machine tool control for effecting a series of punching operations on a workpiece in response to a sequence of blocks of machine tool commands,
   b. an automatically operable data input means operable to supply a sequence of instructions, and including a coded record with said instructions stored along the length thereof, said coded record having in the sequence of instructions thereon respective abbreviated geometric type macro instructions each representing a respective different geometric pattern of points on a workpiece, and
   c. a stored program digital computer operably connected on line with said data input means for receiving said instructions therefrom, and operable to respond to said instructions to generate corresponding blocks of machine tool commands in accordance therewith, and operably connected on line with said machine tool control for transmitting said corresponding blocks of machine tool commands to said machine tool control, thereby providing direct control of the machine tool in the execution of a series of punching operation without the necessity of storage of said series of blocks of machine tool displacement commands in said computer, said computer itself having as a part thereof a computer memory and having stored in said computer memory a macro language machine tool control program including subprograms for controlling said computer in responding to the respective abbreviated geometric type macro instructions to generate corresponding sequences of blocks of machine tool commands, and said computer memory having included said macro language machine tool control program for controlling the computer to transmit the blocks of machine tool commands of a sequence corresponding to each of said abbreviated geometric type macro instructions as they are generated directly to said machine tool control, thereby effecting the immediate punching of a group of holes disposed in a given geometric pattern in response to each such abbreviated geometric type macro instruction, without any recording of said sequences of blocks of machine tool commands on the coded record, whereby a coded record of greatly reduced length may be utilized to effect punching of a series of holes which includes groups of holes arranged in the respective different geometric patterns.

2. In a machine tool control system including
   a. a machine tool control for effecting a series of work operations at successive points on a workpiece in response to a sequence of blocks of machine tool commands,
   b. an automatically operable data input means operable to supply a sequence of instrucitons, and including a coded record with said instructions stored along the length thereof, said coded record having in the sequence of instructions thereon respective abbreviated geometric type macro instructions each representing a respective different geometric pattern of points on a workpiece, and
   c. a stored program digital computer operably connected on line with said data input means for receiving said instructions therefrom, and operable to respond to said instructions to generate corresponding blocks of machine tool commands in accordance therewith, and operably connected on line with said machine tool control for transmitting said corresponding blocks of machine tool commands to said machine tool control, thereby providing direct control of the machine tool in the execution of a series of work operations without the necessity of storage of said series of blocks of machine tool displacement commands in said computer, said computer itself having as a part thereof a computer memory and having stored in said computer memory a macro language machine tool control program including subprograms for controlling said computer in responding to the respective abbreviated geometric type macro instructions to generate corresponding sequences of blocks of machine tool commands, and said computer memory having included therein a portion of said macro language machine tool control program for controlling the computer to transmit the blocks of machine tool commands of a sequence corresponding to each of said abbreviated geometric type macro instructions as they are generated directly to said machine tool control, thereby effecting consecutive work operations at a group of points disposed in a given geometric pattern in response to each such abbreviated geometric type macro instruction, without any recording of said sequences of blocks of machine tool commands on the coded record, whereby a coded record of greatly reduced length may be utilized to effect consecutive work operations which include consecutive work operations at groups of points arranged in the respective different geometric patterns.

* * * * *